United States Patent [19]

Myles

[11] 4,246,797
[45] Jan. 27, 1981

[54] PRESSURE INDICATOR

[75] Inventor: J. Edgar Myles, W. Bloomfield, Mich.

[73] Assignee: J. E. Myles, Inc., Troy, Mich.

[21] Appl. No.: 99,954

[22] Filed: Dec. 3, 1979

Related U.S. Application Data

[63] Continuation-in-part of Ser. No. 31,270, Apr. 18, 1979, Pat. No. 4,199,992, which is a continuation of Ser. No. 945,762, Sep. 25, 1978, abandoned.

[51] Int. Cl.³ ............................................. G01L 7/16
[52] U.S. Cl. ....................................................... 73/744
[58] Field of Search ............... 73/744, 745, 746, 146.8, 73/146.3

[56] References Cited

U.S. PATENT DOCUMENTS

| | | | |
|---|---|---|---|
| 1,250,414 | 12/1917 | Austin | 73/744 |
| 1,392,587 | 10/1921 | Low | 73/744 |
| 1,716,399 | 6/1929 | Watters | 73/744 |
| 3,286,729 | 11/1966 | Guy | 73/744 |
| 3,596,521 | 8/1971 | Guy | 73/744 |
| 3,677,089 | 7/1972 | Martin | 73/744 |
| 3,889,530 | 6/1975 | Bluem | 73/146.8 |
| 3,910,120 | 10/1975 | Martin | 73/744 |
| 4,136,560 | 1/1979 | Gellos | 73/146.8 |

Primary Examiner—Donald O. Woodiel
Attorney, Agent, or Firm—Cullen, Sloman, Cantor, Grauer, Scott & Rutherford

[57] ABSTRACT

The pressure indicator has a body provided with an attachment shank having a pressure fluid passage. A cylinder bore is located in the body and communicates with the passage. An end plug having a bore and a counterbore is threaded into the body. A piston is nested in the cylinder bore and has a piston rod axially extending through the cylinder bore and projecting through and outwardly of the plug. A compression spring is interposed between the plug and piston and yieldably biases the piston towards the fluid passage against the pressurized fluid. The improvement resides in the provision of a backup bushing nested within the plug bore which axially and guidably receives the piston rod. A cylindrical slide seal of a permanently lubricated material is nested within the plug bore and projects into and depends from the bushing in sealing engagement with the piston rod. An integral spring retainer and bearing assembly has a bore through which the piston rod extends and includes an annular bearing which extends into the plug bore and is spaced from the backup bushing. An O-ring in the plug bore is sealingly interposed between the plug and the slide seal and occupies the space between the bushing and bearing.

18 Claims, 8 Drawing Figures

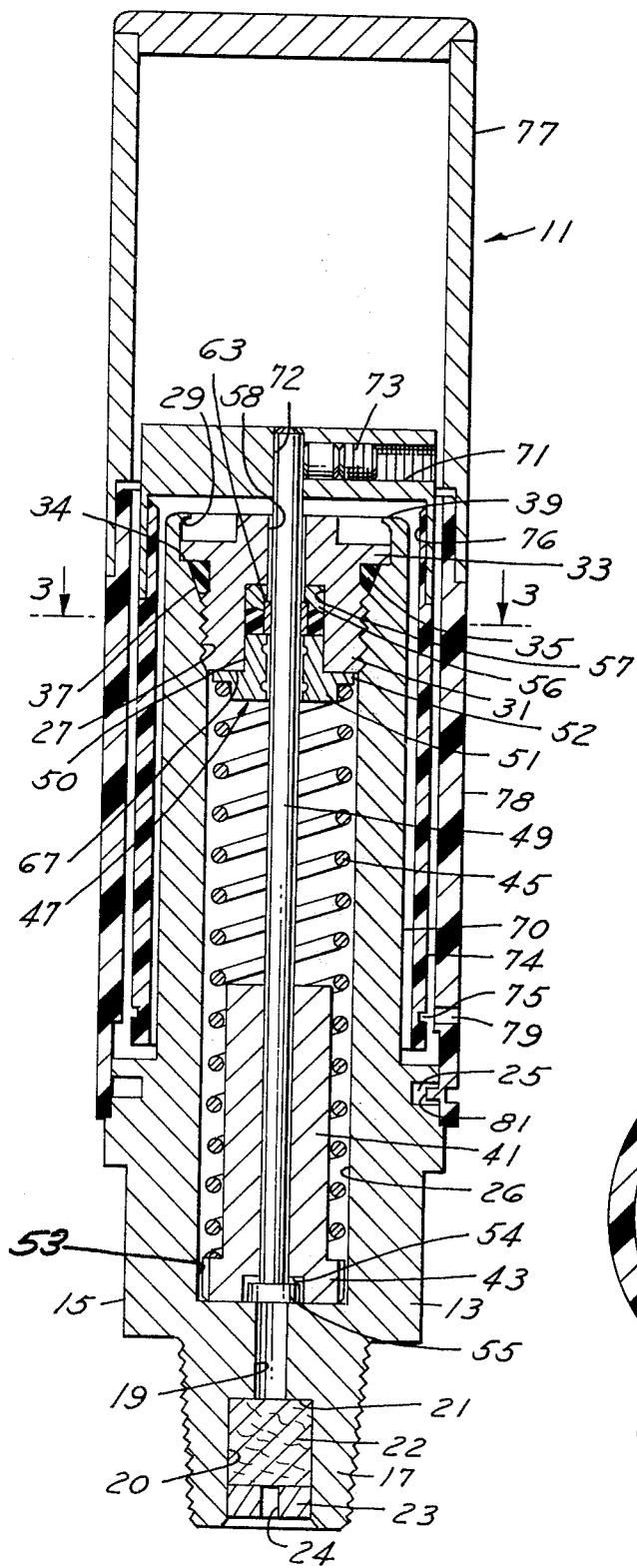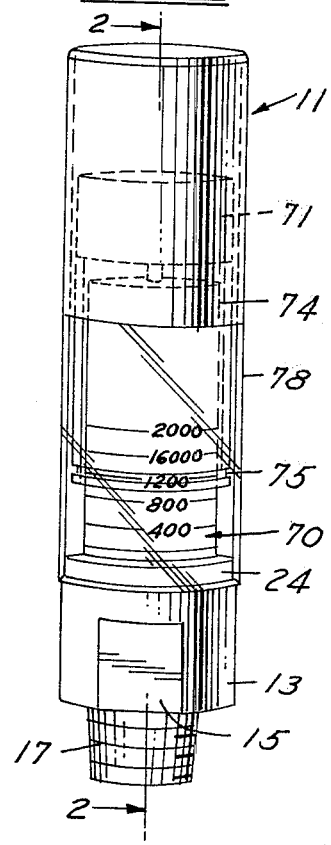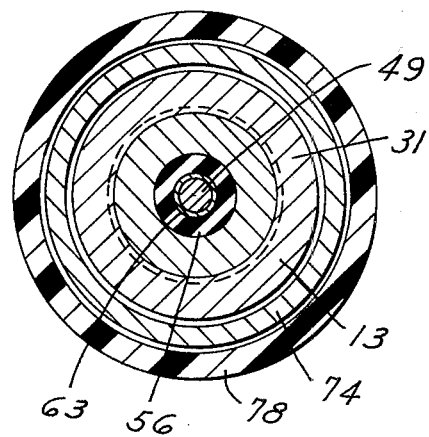

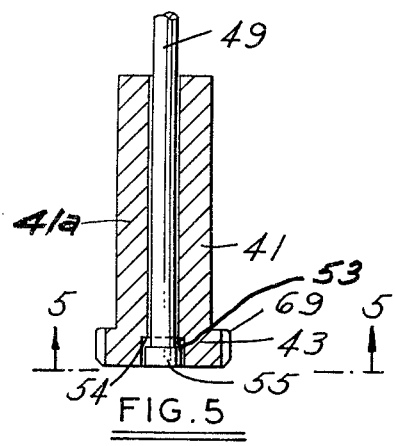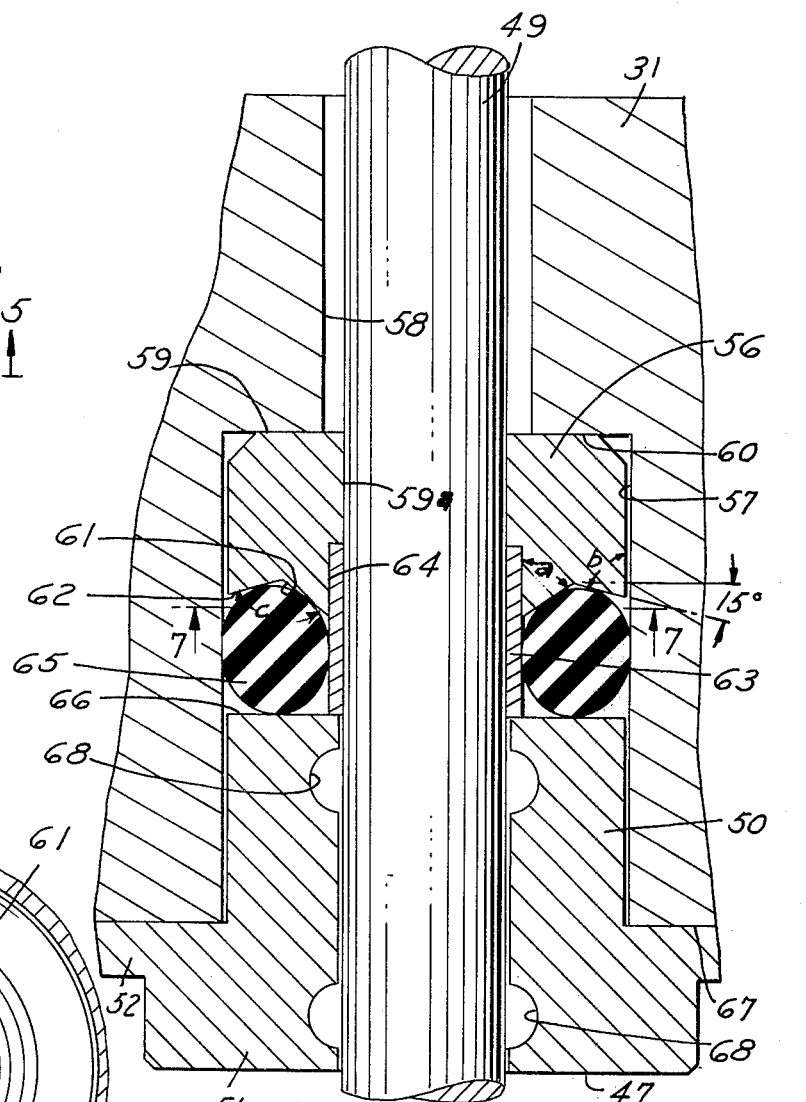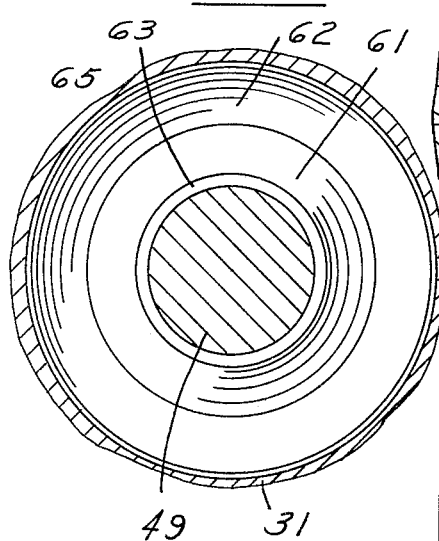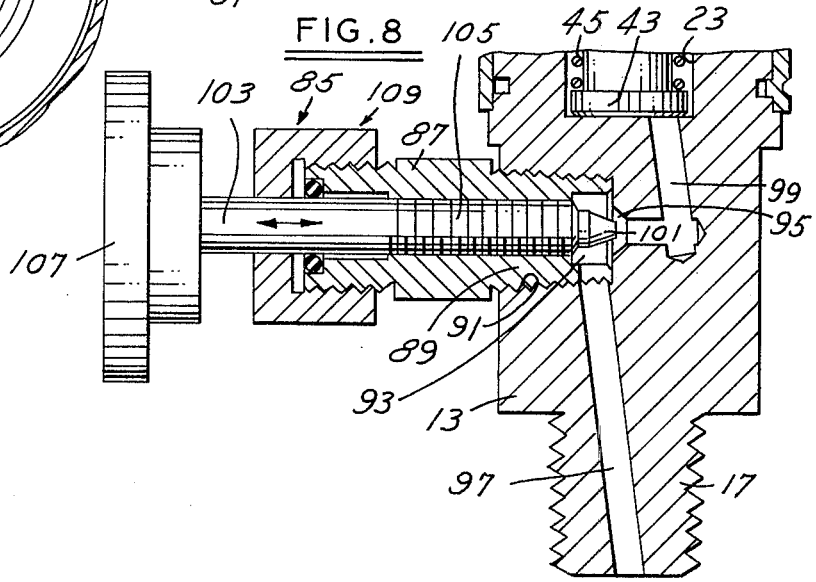

PRESSURE INDICATOR

CROSS-REFERENCES TO RELATED APPLICATIONS

This patent application is a continuation-in-part application of U.S. patent application Ser. No. 031,270, which was filed on Apr. 18, 1979 for *PRESSURE INDICATOR*, now U.S. Pat. No. 4,199,992, which in turn was a continuation application of U.S. patent application Ser. No. 945,762, filed on Sept. 25, 1978 entitled *PRESSURE INDICATOR*, now abandoned.

BACKGROUND OF THE INVENTION

Pressure indicators of the type disclosed are known to include metallic body with a threaded attachment shank having a pressure fluid passage adapted for connection to a source of pressure to be measured. A cylindrical bore is provided within the body which communicates with the passage and has a threaded open end receiving an end plug having a bore and which is threaded into the body. A piston is nested in the cylinder and has a piston rod axially extending through the cylinder bore and through the plug. A compression spring is interposed between the plug and piston retainingly engaging the piston and the piston being variably movable longitudinally against the spring on application of fluid under pressure, with the extent of movement providing a visual indication of the pressure applied. Examples of this type of pressure indicator are shown in U.S. Pat. No. 3,677,089 of Clyde J. Martin, granted July 18, 1972 and U.S. Pat. No. 3,910,210 of Clyde J. Martin, granted Oct. 7, 1975.

In constructions of this type wherein the pressure indicator may be subjected to pressures up to 5,000 PSIG, the problem has long existed of providing a guide bearing and seal for the movable end of the piston rod within the indicator body so as to eliminate binding to, thus, provide an accurate reading of the pressure applied to the pressure indicator.

SUMMARY OF THE INVENTION

It is a feature of the present invention to provide a pressure indicator having a body with an attachment shank provided with a pressure fluid passage. A cylinder bore is provided in the body and at one end communicates with the passage. The other end of the body is open and threaded. An end plug with inner and outer ends has a bore and a counterbore and is threaded into the open end of the body. The plug bore terminates at the inner end in a first annular abutment surface which faces said one end of the body. The counterbore of the end plug terminates in a second annular flat abutment surface located between the inner and outer ends of the plug and forms one end of the plug bore.

It is a further feature of the present invention to provide a pressure indicator of the aforementioned type wherein a piston is nested within the cylinder bore having an elongated piston rod axially extending through the cylinder bore and projecting through and outwardly of the plug. A compression spring is interposed at its ends between the plug and piston yieldably biasing the piston towards said one end of the cylinder bore. The piston is variably movable longitudinally against the spring on application of pressure to the fluid passage.

It is a still further feature of the present invention to provide a pressure indicator of the aforementioned type wherein a bushing is nested within the plug bore and abuts the second abutment surface. The bushing axially and guidably receives the piston rod. A cylindrical slide seal of a permanently lubricated material is located within the plug bore and projects into and depends from the bushing in sealing engagement with the piston rod.

Another feature of the present invention is to provide a pressure indicator of the aforementioned type wherein an integral spring retainer and bearing assembly has a bore through which the piston rod extends. The assembly has an annular bearing, an annular spring guide and a flange separating the bearing from the guide. The bearing extends into and pilots in the bore of the end plug and is spaced from and cooperates with the bushing. The flange abuts the first abutment surface. Finally, an O-ring seal is located in the plug bore sealingly interposed between the plug and slide seal and occupying the space or cavity between the bushing and the bearing. The cavity is larger in volume than the O-ring.

Another feature of the present invention is to provide a pressure indicator of the aforementioned type wherein the opposing end surfaces of the bushing and the bearing contacts the O-ring seal.

Still another feature of the present invention is to provide a pressure indicator of the aforementioned type wherein the bore of the retainer and bearing assembly has a surface spaced from the piston rod and provided with annular balancing grooves for equalizing the pressure of the fluid acting on the piston rod throughout 360° thereby centering the piston rod.

A further feature of the present invention is to provide an improved guide, bearing and seal arrangement for the piston rod of the aforementioned type, with the cavity for the O-ring seal being larger than the O-ring whereby the O-ring may be forced or squashed into the corners of the cavity as the pressure of the fluid increases.

Another feature of the present invention is to provide an improved guide, bearing and seal arrangement for the piston rod of the aforementioned type wherein only a part of the force applied to the O-ring seal is transmitted to the shaft slide seal, thereby providing a generally constant force on the shaft slide seal which is transmitted to the piston rod.

Another feature of the present invention is to provide an improved guide, bearing and seal arrangement for the piston rod of the aforementioned type wherein the O-ring seal is provided with an initial preload to provide an existing force on the slide seal and shaft upon assembly.

BRIEF DESCRIPTION OF THE DRAWINGS

FIG. 1 is a front perspective view of the pressure indicator.

FIG. 2 is a vertical section of the pressure indicator, on an increased seale, and looking in the direction of arrows 2—2 of FIG. 1;

FIG. 3 is a section of the pressure indicator looking in the direction of arrows 3—3 of FIG. 2;

FIG. 4 is a vertical sectional view of the piston and piston rod assembly;

FIG. 5 is an end view of the piston, looking in the direction of arrows 5—5 of FIG. 4;

FIG. 6 is a fragmentary elevation, in section, corresponding to FIG. 2 but on an increased scale and illustrating the bearing and seal arrangement with respect to the piston rod;

FIG. 7 is a sectional view taken on the line 7—7 of FIG. 6; and

FIG. 8 is a fragmentary vertical section showing a modification of the pressure indicator of FIG. 1 incorporating a shut-off needle valve.

It will be understood that the above drawings illustrate merely preferred embodiments of the invention, and that other embodiments are contemplated within the scope of the claims hereafter set forth.

DETAILED DESCRIPTION OF THE PREFERRED EMBODIMENT

Referring now to the drawings, the pressure indicator or gauge is designated at 11 in FIGS. 1 and 2, and includes an elongated metallic body 13 of cylindrical form having adjacent its lower end on opposite sides thereof a pair of wrench-engaging flats or flat surfaces 15. The body 13 terminates in the threaded assembly shank 17 having therethrough pressure fluid passage 19. The passage 19 at its outer end is provided with an enlarged bore or cavity 20 having an abutment surface 21. A filter 22 is located in cavity 20 and is held against abutment surface 21 by a restrictor 23 having a passage 24 which is smaller in diameter than passage 19. The filter 22 is made from porous bronze material.

The body 13 includes adjacent the flats 15, an annular stop shoulder 24 and thereabove an annular groove 25 and includes an elongated cylinder bore 26. The upper end of the body 13 has a threaded bore 27 and outwardly thereof a counterbore 29 of increased radius.

End plug 31 is snugly threaded into bore 27 and includes across its top a transverse flange 33 of increased radius. The flange 33 is nested within the counterbore 29 and bears against the adjacent shoulder 34 as shown in FIG. 2.

Below the shoulder 34 is an annular inwardly extending tapered surface 35 which is spaced from the plug 31. Within the space and under compression is the O-ring 37 which is snugly interposed between the tapered surface 36 and the plug 31 engaging and being located below top flange 33. This completes the seal between the plug 31 and the body 13.

The upper end of the body 13 adjacent its counterbore 29 has an inturned-portion or stop 39 which is adapted to limit relative outward movement of the flange 33 and plug 31 should an excessive pressure be so applied to the plug 31. In the event the gauge 11 is over-pressurized, the top flange 33 will open to the stop 39 allowing the over-pressure to relieve over a controlled orifice area. This provides a safety relief valve feature preventing uncontrolled explosion or missiling in the event the gauge 11 is over-pressurized.

In the present construction, the plug 31 and the threading therein is constructed to have an excessive shear strength such that, the flange 33 of the plug 31 would actually bend before the threads sheared. The pressure indicator 11 has been tested to withstand high as well as low pressures including indicators operating from 0 to 400 PSIG and at 1000 PSIG, 2000 PSIG, 3000 PSIG and 5000 PSIG.

Nested within the cylinder bore 26 of the body 13 is the elongated hollow piston 41 having at one end the enlarged spring seat 43 of annular form and which supportably engages compression spring 45. The spring 45 is disposed around the piston 41 and is interposed between seat 43 and the integral spring retainer and bearing assembly 47 which underlies plug 31. Assembly 47 has a through bore 48 through which the piston rod 49 extends. Assembly 47 has an annular bearing 50, an annular spring guide 51 and a flange 52 separating the bearing 50 and guide 51.

The elongated piston rod 49 extends axially of and through the hollow piston 41. The piston 41 has a centrally located recess 53 having a stop surface 54. The rod 49 has on one end a head 55 which is received in cavity 54 of the piston 41 when the rod and piston are assembled. The rod 49 is adapted to extend up through end plug 31 and the seal back-up and bearing 56 therein and outwardly of the end of the body 13.

The end plug 31 has a bore 57 and a counterbore 58. Bearing or bushing 56 is nested within bore 57 and has an axial bore 59a to slidably receive the piston rod 49. To minimize or prevent binding between the piston rod 49 and bearing 56, these components are constructed of different metallic materials.

In the illustrative embodiment and preferred form, the bearing 56 is constructed, as an example, of brass or bronze or aluminum copper and the piston rod 49 is of steel and has a chrome micro-finish thereon reducing friction and binding. Alternately, the piston rod 49 has a nickel-plating thereon and is highly polished with a micro-finish for this same purpose.

The seal back-up and bearing 56 has on one end thereof an annular flat surface 59 which faces and abuts the second abutment surface 60 formed by the counterbore 57 of the end plug 31. The other end of the bearing 56 is defined by a pair of intersecting surfaces 61, 62. Surface 61 is arranged at an angle "a" (FIG. 6) and the other surface 62 is arranged at an angle "b". The surfaces 61 and 62 intersect at an included angle "c" (FIG. 6). As an example, angle "a" is preferably 45°; angle "b" is preferably 75°; and angle "c" is preferably 120°. The use of such angles is important; however angles "a" and "b" may vary ±15° thereby resulting in angle "a" having a range of 30° to 65°; angle "b" having a range of 60° to 90°; and angle "c" thereby varying in the range of 90° to 150°. The sizes of the angles may also vary in different gauge models.

Elongated sealing sleeve 63 of a permanently lubricated material as, for example, Teflon is snugly and frictionally projected up into the lower end portion or bore 64 of the bearing 56 and cooperatively and sealing receives piston rod 49 as shown on an enlarged scale in FIG. 6. O-ring seal 65 is interposed in compression between the plug 31 and the sealing sleeve 63 to establish a further seal between the rod 49 and the plug 31 and to prevent the escape of pressure from the interior of the cylinder bore 23.

In assembly the O-ring 65 is loose on the rod 48 and is thereafter rolled over the sealing sleeve 63. At such time the outside diameter of the O-ring 65 is slightly larger than the outside diameter of bearing 56. Thereafter end plug 31 has an inside diameter slightly larger than the outside diameter of bearing 56 but smaller than O-ring 65 so as to compress O-ring 65 to reduce diameter of same and place the sleeve 63 under the O-ring in compression or under a pre-load.

The end surface 66 of the annular bearing may or may not contact the O-ring 65 to assist in squeezing same in the space between the intersecting surfaces 61,62 of the bearing 56 and the end face or surface 66 of the annular bearing 50 which fits into and is piloted in the bore 57 of the end plug 31. When assembled the flange 52 engages the first abutment surface 67. Balancing grooves 68 are provided in the seal back-up and bearing 47 for the purpose of centering the rod or shaft 49 in the body 13 by having the fluid acting around 360°. If the pressure of the fluid did not act throughout 360°, the force would push the shaft 49 to one side, wearing the inside diameter of the spring retainer and bearing assembly 47.

Angle "a" as shown in FIG. 6 allows relief for the O-ring 65. As the load in pounds of force per square inch increases on the O-ring 65, the latter is "squashed" into the available room. As the force exerted on the O-ring 65 is increased, the O-ring displaces itself into the corners, the end plug/back-up bearing corner and the back-up bearing/seal corner. With such design the entire force is not transmitted through the O-ring 65 to the seal 63 but rather a fraction or percentage of the force is maintaining a constant force on the seal 63 which is transmitted to the rod 49.

O-ring 65 is assembled with a slight preload. A force exists on the seal 63 and shaft 49 upon assembly as the force increases. An additional force on the shaft or rod 49 and seal 63 does not exist until O-ring 65 can no longer be displaced into the provided cavities. Angle "a" is the angle to provide enough cavity or space for the O-ring 65 to be displaced but not too much cavity so that there is not enough force on the seal 63 and shaft or rod 49 to create a seal.

The main purpose of angle "b" is to help prevent extrusion of the O-ring 65 in between the back-up bearing 56 and the end plug 31. This is accomplished by providing more cavity forcing O-ring 65 out of the back-up bearing/end plug corner. Angle "b" is of course required at higher pressures and in fact could be zero at lower pressures.

The spring seat 43 of the elongated piston 41, as an example, is provided on the periphery thereof with four vertical notches 69 (FIGS. 4 and 5) located 90° apart. Each notch 69 has a pair of surfaces arranged at 45°. Such surfaces however may be formed on a radius. The purpose of the notches 69 is to permit fluid in the chamber or bore 26 on opposite sides of the spring seat 43.

The outside diameter of the stem 41a of the tubular piston 41 and the outside diameter of the spring guide 51 are generally equal to the inside diameter of the spring 45. The stem 41a forms a support and guide for the spring 45 and helps to hold it concentric. The spring retainer and bearing assembly 47 helps to retain the spring 45 and to prevent the rod 49 from wobbling or tilting.

Applied to the exterior surface of the body 13 is the upright scale 70 for measuring pressures between 80 and 5,000 PSIG. In the illustration shown in FIG. 1, the scale indicates merely the pressures 400 to 2,000 PSIG. Additional scales 70 are also applied to the body 13, being 90-degree related therearound whereby, pressure indications may be read throughout 360 degrees.

The downwardly opening annular inner indicator cap 71 has an axial bore 72 receiving the piston rod 49. The cap 71 is secured to the piston rod 49 by the transverse set screw 73, FIG. 2. Elongated upright scale indicator sleeve 74 of a plastic material, at its upper end projects up into the cap 71 and is secured thereto. The indicator sleeve 74 is arranged outwardly of the upper end of the body 13 therearound, overlies the respective scale or scales 70 and has adjacent its lower end the annular scale reader slot 75.

Accordingly upon the application of pressure to the passage 19, there will be a corresponding upward movement of the piston 41 and associated piston rod 49 compressing the spring 45 and effecting a corresponding longitudinal movement of the scale indicator sleeve 74. So variably elevated depending upon the pressures applied, there can be a direct visual reading of the scales 70 through the annular indicator slot 75 viewed from any direction throughout 360 degrees.

The upper end of the scale indicator sleeve 74 has an annular assembly flange 76 which is frictionally or otherwise projected up into the depending flange of the cap 71 so that the indicator sleeve 74 moves in unison with longitudinal adjustments of piston rod 49.

A cylindrical enlarged top enclosure 77 of a plastic material is mounted over and around the body and outwardly of the indicator sleeve 74 surrounding the same. The upper portion of top enclosure 77 may be opaque whereas, the lower part of the enclosure 77 includes plastic transparent enclosure member 78 as a part of or connected to top closure 77. The lower end of the enclosure element 78 is staked to the body 13, as an example, at three or more circumferentially located places or areas 81 (FIG. 2).

A vent aperture 79 is provided through the lower portion of the closure element 78 to permit the movement of atmospheric air to and from the interior of the enclosure upon vertical adjustments of the indicator sleeve 74 and attached cap 71 to avoid any compression of air therewithin the top enclosure 77-78.

The present pressure indicator may be used for testing the pressure of oils, water, gas, air at high and low temperatures and involving corrosive atmospheres.

FIG. 8 fragmentarily illustrates the present body 13 above described with respect to FIG. 2 and which includes the manual shut-off needle valve assembly 85. The shut-off assembly 85 includes the body 87 which extends radially of indicator body 13 and has a threaded shank 89 which extends into the radial interiorly threaded bore 91 in the pressure indicator body 13. The body 13 includes the chamber 93 having valve seat 95 and the communicating passage 99 which extends up to the cylinder bore 23.

The shank 17 has a pressure fluid passage 97 corresponding to the passage 19 of FIG. 2 and which communicates with the chamber 93 for providing pressure thereto when the indicator has been assembled over an apertured portion of a body from which communication is established to a source of pressure fluid to be measured. The needle valve 101 is positioned within the chamber 93 and is arranged axially of the elongated shank 103 which is threaded at 105 into body 87 and includes the exterior handle 107. Seal assembly 109 receives shank 103 and is threaded over a portion of the body 87 with a suitable seal interposed.

Needle valve 101 shown in FIG. 8 as spaced from seat 95 is adapted for movements relative to the seat 95 and into engagement with the seat 95 for closing off the flow of pressure fluid through the passages 97 and 99.

Rather than providing an upright scale 70 with a designated numerical pressure range on the body 13, a three color coded indicator or scale without numbers, consisting of a series of annular bands of different colors, may be employed on the body 13. A suitable decal or label forming the indicator or scale is provided and consists of a lower annular green band, an intermediate annular yellow band and an upper annular red band. When the indicator sleeve 74 moves upwardly, the annular scale reader slot 75 will first overlie the green band indicating that "all is well". As the sleeve 74 moves further upwardly, the slot will next overlie the yellow band indicating a "caution" condition; and finally as the sleeve 74 moves further upwardly the reader slot 75 overlies and exposes the red band indicating a "dangerous" condition. A gauge with a color coded scale illustrates a spectrum of pressure. Such a gauge serves as a "go" or "no-go" indicator and is used in applications where an exact pressure "read-out" is not desirable but only an acceptable operating range is required. Other advantages are less down-time by preventing vehicle, machine and tooling breakage and by preventing unauthorized tinkering in many plants when machine operators and other plant personnel tinker with the fluid system operating relief valve. A further advantage is that a person can obtain a 360° system analysis when it is important to monitor the proper operating range. The maximum pressure range of the gauge is stamped or placed on the gauge. It should be appreciated that any number of different "color" bands may be used, with each band generally representing 1,000 PSIG. As an example if the gauge is rated at 5,000 PSIG there will be five different color bands utilized on the scale label.

What is claimed is:

1. A pressure indicator having a body with an attachment shank with a pressure fluid passage, a cylinder bore at one end communicating with said passage and having the other end opened and threaded, an end plug with inner and outer ends, said plug having a bore and a counterbore snugly threaded into said open other end, the bore of said end plug terminating at said inner end in a first annular flat abutment surface which faces said one end of said body, the counterbore of said end plug terminating in a second annular flat abutment surface located between the inner and outer ends of said plug and forming one end of said plug bore, a piston nested in said cylinder bore having an elongated piston rod axially extending through said cylinder bore and projecting through and outwardly of said plug, a compression spring interposed at its ends between said plug and piston yieldably biasing said piston towards said one end of said cylinder bore, said piston being variably movable longitudinally against said spring on application of pressure to said pressure fluid passage, a bushing nested within said plug bore and abutting said second abutment surface, said bushing axially and guidably receiving said piston rod, a cylindrical slide seal of a permanently lubricated material within said plug bore and projecting into and depending from said bushing in sealing engagement with said piston rod, an integral spring retainer and bearing assembly having a bore through which said piston rod extends, said assembly having an annular bearing, an annular spring guide and a flange separating said bearing and said guide, said bearing extending into and piloting in the bore of said end plug and being spaced from said bushing, said flange abutting said first abutment surface, and an O-ring seal in said plug bore sealingly interposed between said plug and slide seal and occupying the space between said bushing and said bearing.

2. The pressure indicator defined in claim 1 wherein the opposing end surfaces of said bushing and said bearing contact said O-ring seal.

3. The pressure indicator defined in claim 1 wherein said opposing end surface of said bearing is flat and is parallel to said abutment surfaces.

4. The pressure indicator defined in claim 3 wherein said flat opposing end surface of said bearing abuts the opposite end of said cylindrical slide seal.

5. The pressure indicator defined in claim 1 wherein the bore of said retainer and bearing assembly has a surface spaced from said piston rod and provided with annular balancing grooves.

6. The pressure indicator defined in claim 2 wherein said opposing end surface of said bushing is defined by a pair of intersecting surfaces.

7. The pressure indicator defined in claim 2 wherein said opposing end surface of said bushing has a pair of intersecting surfaces having an included angle therebetween in the range of 90° to 150°.

8. The pressure indicator defined in claim 1 wherein said pressure fluid passage is provided with a filter and a restrictor.

9. The pressure indicator defined in claim 1 wherein said piston is formed separately from said piston rod, said piston having a bore extending from one end to the other end, the end of said piston adjacent said one end of said cylinder bore having a recess, and said piston rod extending through the bore of said piston and having a head received in said recess.

10. The pressure indicator defined in claim 9 wherein said piston is elongated and includes a cylindrical spring guide which receives and pilots one end of said compression spring, with the other end of said spring being piloted on said annular spring guide of said retainer and bearing assembly.

11. The pressure indicator defined in claim 1, said piston rod being of a material different from said bushing and said bearing assembly thereby eliminating binding therebetween.

12. The pressure indicator defined in claim 1 wherein said body outwardly of its threaded end having a counterbore of increased diameter defining a stop shoulder, a transverse top flange on said end plug nested in the counterbore of said body and bearing against said shoulder, and end portions of said body at said counterbore being inturned limiting relative outward movement of said top flange relative to said body, whereby application of an over-pressure to said end plug is relieved over a controlled orifice area providing a safety relief.

13. The pressure indicator defined in claim 12 wherein said body longitudinally inward of said shoulder having an annular tapered surface spaced from said plug below said top flange, and an O-ring seal compressively nested between said tapered surface and said plug.

14. The pressure indicator defined in claim 1 wherein an upright scale is imprinted upon the exterior of said body longitudinally thereof indicating PSIG, a downturned cap axially receiving and secured to the end of said piston rod, surrounding and spaced outwardly of said body at its upper end, a transparent cylindrical scale indicator secured to and depending from said cap surrounding said body, and annular scale reader groove formed in said scale indicator registering along the height of said scale for directly reading the pressure applied to said fluid passage.

15. The pressure indicator defined in claim 14 wherein there being a series of 90-degree spaced additional scales imprinted on and around said body for readability of pressures throughout 360 degrees.

16. The pressure indicator defined in claim 14 wherein there being an annular groove formed in said body adjacent the shank end thereof, a cylindrical enclosure having a transparent portion loosely receiving said scale indicator with its open end bearing against said body adjacent said annular groove, and a series of circumferentially spaced staked fingers on said cylindrical enclosure and located in said annular groove for securing said enclosure to said body.

17. The pressure indicator defined in claim 1 wherein a shut-off needle valve assembly is mounted upon said body adjacent its shank extending radially thereof, and including a manually adjustable needle valve element normally closing off said shank passage.

18. The pressure indicator defined in claim 12 wherein a chamber in said body communicates with said passage and cylinder bore having a valve seat, said needle valve element adapted for registry with said seat and for adjustments outwardly thereof.

* * * * *